US008515885B2

(12) United States Patent
Modha

(10) Patent No.: US 8,515,885 B2
(45) Date of Patent: Aug. 20, 2013

(54) NEUROMORPHIC AND SYNAPTRONIC SPIKING NEURAL NETWORK WITH SYNAPTIC WEIGHTS LEARNED USING SIMULATION

(75) Inventor: Dharmendra S. Modha, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 367 days.

(21) Appl. No.: 12/916,332

(22) Filed: Oct. 29, 2010

(65) Prior Publication Data

US 2012/0109864 A1    May 3, 2012

(51) Int. Cl.
*G06E 1/00* (2006.01)
(52) U.S. Cl.
USPC .......................................................... 706/16
(58) Field of Classification Search
USPC .................. 706/12, 45, 47, 62, 15–16, 25–27
See application file for complete search history.

(56) References Cited

U.S. PATENT DOCUMENTS

| | | | |
|---|---|---|---|
| 4,773,024 A | 9/1988 | Faggin et al. | |
| 5,299,286 A | 3/1994 | Imondi et al. | |
| 7,143,072 B2 | 11/2006 | Masgonty et al. | |
| 7,457,787 B1 | 11/2008 | Furber | |
| 7,533,071 B2 | 5/2009 | Snook et al. | |
| 2011/0106741 A1* | 5/2011 | Denneau et al. | 706/25 |

FOREIGN PATENT DOCUMENTS

WO    2006000103 A1    1/2006

OTHER PUBLICATIONS

Wolff et al., ParSPIKE—A Parallel-Accelerator for Dynamic Simulation of Large Spiking Neural Networks, 1999, MicroNeuro, pp. 1-8.*
Hellmich et al., AnFPGA based Simulation Acceleration Platform for Spiking Neural Networks, 2004, IEEE, pp. 389-392.*
Glackin et al., A Novel Approach for the Implementation of Large Scale Spiking Neural Networks on FPGA Hardware, 2005, Springer-Verlag, pp. 552-563.*
Vogelstein et al., Silicon Spike-Based Synaptic Array and Address-Event Transceiver, 2004, IEEE, pp. 385-388.*
Renaud, S. et al., "PAX: A mixed hardware/software simulation platform for spiking neural networks," Neural Networks, Sep. 1, 2010, pp. 905-916, vol. 23, No. 7, Elsevier Science Publishers, Barking, Great Britain.
Snider G.S., "Spike-Timing-Dependent Learning in Memristive Nanodevices," 2008 IEEE/ACM International Symposium on Nanoscale Architectures, Jun. 12, 2008, pp. 85-92, IEEE, New Jersey, United States.
Rast, A. et al., "Virtual Synaptic Interconnect Using an Asynchronous Network-on-Chip," 2008 International Joint Conference on Neural Networks, Jun. 1, 2008, pp. 2727-2734, IEEE, New Jersey, United States.

(Continued)

*Primary Examiner* — David Vincent
(74) *Attorney, Agent, or Firm* — Kenneth L. Sherman, Esq.; Michael Zarrabian, Esq.; Sherman & Zarrabian LLP

(57) ABSTRACT

Embodiments of the invention provide neuromorphic-synaptronic systems, including neuromorphic-synaptronic circuits implementing spiking neural network with synaptic weights learned using simulation. One embodiment includes simulating a spiking neural network to generate synaptic weights learned via the simulation while maintaining one-to-one correspondence between the simulation and a digital circuit chip. The learned synaptic weights are loaded into the digital circuit chip implementing a spiking neural network, the digital circuit chip comprising a neuromorphic-synaptronic spiking neural network including plural synapse devices interconnecting multiple digital neurons.

25 Claims, 9 Drawing Sheets

(56) References Cited

OTHER PUBLICATIONS

Ros, E. et al., "Real-Time Computing Platform for Spiking Neurons (RT-Spike)," IEEE Transactions on Neural Networks, Jul. 1, 2006, pp. 1050-1063, vol. 17, No. 4., IEEE, United States.

Schemmel, J., et al., "Implementing Synaptic Plasticity in a VLSI Spiking Neural Network Model," 2006 International Joint Conference on Neural Networks, Jan. 1, 2006, pp. 1-6, IEEE, New Jersey, United States.

Brette, R., et al., "Simulation of networks of spiking neurons: A review of tools and strategies," Journal Computer Neuroscience, Jul. 12, 2007, pp. 349-398, vol. 23, No. 3, Kluwer Academic Publishers, Boston, United States.

International Search Report and Written Opinion dated Nov. 7, 2011 for International Application No. PCT/EP2011/063485 from the European Patent Office, pp. 1-15, Rijswijk, Netherlands.

Burattini, E. et al., "NSP: A Neuro-Symbolic Processor", Lecture Notes in Computer Science (IWANN 2003), vol. 2687, Springer-Verlag, 2003, pp. 9-16, Berlin, Germany.

Mitra, S., "Learning to Classify Complex Patterns Using a VLSI Network of Spiking Neurons", MTech Microelectronics, Indian Institute of Technology, Diss. ETH No. 17821, 2008, pp. a-147, Bombay, India.

Shayani, H. et al., "An FPGA-based Model suitable for Evolution and Development of Spiking Neural Networks", European Symposium on Artificial Neural Networks—Advances in Computational Intelligence and Learning (ESANN 2008), ESANN, Apr. 2008, pp. 197-202, Bruges, Belgium.

Folling, S. et al., "Single-Electron Latching Switches as Nanoscale Synapses", Proceedings International Joint Conference on Neural Networks (IJCNN 2001), Int. Neural Network Society, Mount Royal, NY, pp. 216-221, United States.

\* cited by examiner

| Simulation | Correspondence | Chip |
|---|---|---|
| Digital, Synchronous Spiking Neurons Resolution of 0.1-1ms Axonal Delays Multi-Compartment Neuron Models | ↕ | Digital, Synchronous Spiking Neurons Resolution of 0.1-1ms Axonal Delays Multi-Compartment Neuron Models |
| Learning (STDP, Reinforcement, Arbitrarily Complex) as Long Final Learned Synapses are Binary or Discrete | ↑ | No Learning, Binary (or Discrete) Synapses Implements Final Product of Simulation |
| Physical and Logical Connectivity Constraints Consistent with Chip Implementation | ↓ | Cross-Bar, Cross-Quilt Provide Physical Connectivity Constraints; Address-Events Provide logical Connectivity Constraints |
| Randomness in Synapse Operation Consistent with Measured Synaptic Yield on Chip | ↓ | Randomness in Synapse Yield |
| Randomness in Axonal Delay Consistent with Measured On-Chip Asynchronous Communication Delays | ↓ | Non-Determinism in Axonal Delay Due to On-Chip Asynchronous Communication Delays |
| Function | | Low-Power, Compact, Real-Time |

FIG. 1B

Configuration:
32K Neurons, 1M Synapses

Configuration:
256K Neurons, 16M Synapses

NEUROMORPHIC AND SYNAPTRONIC SPIKING NEURAL NETWORK WITH SYNAPTIC WEIGHTS LEARNED USING SIMULATION

This invention was made with Government support under HR0011-09-C-0002 awarded by Defense Advanced Research Projects Agency (DARPA). The Government has certain rights in this invention.

BACKGROUND

The present invention relates to neuromorphic and synaptronic systems, and in particular, to low-power, ultra-dense neuromorphic-synaptronic circuit chips implementing a spiking neural network.

Neuromorphic-synaptronic systems, also referred to as artificial neural networks, are computational systems that permit electronic systems to essentially function in a manner analogous to that of biological brains. Neuromorphic-synaptronic systems do not generally utilize the traditional digital model of manipulating 0s and 1s. Instead, neuromorphic-synaptronic systems create connections between processing elements that are roughly functionally equivalent to neurons of a biological brain. Neuromorphic-synaptronic systems may be comprised of various electronic circuits that are modeled on biological neurons and synapses.

In biological systems, the point of contact between an axon of a neuron and a dendrite on another neuron is called a synapse, and with respect to the synapse, the two neurons are respectively called pre-synaptic and post-synaptic. The essence of our individual experiences is stored in conductance of the synapses.

BRIEF SUMMARY

Embodiments of the invention provide neuromorphic-synaptronic systems, including neuromorphic-synaptronic circuits implementing spiking neural networks with synaptic weights learned using simulation. One embodiment provides a method comprising simulating a spiking neural network to generate synaptic weights learned via the simulation. The learned synaptic weights are loaded into a neuromorphic-synaptronic circuit chip implementing a spiking neural network.

One-to-one correspondence is maintained between the chip and the simulation. The one-to-one correspondence is achieved by implementing the spiking neural network using digital integrate-and-fire neurons, discrete-valued synapses at cross-point junctions of an interconnection network for interconnecting digital neurons, incorporating physical and logical interconnectivity constraints of the chip into the simulation, and eliminating all sources of randomness or non-determinism on the chip. The architecture of the chip achieves low-power and has small form factor.

In another embodiment a device comprises a neuromorphic-synaptronic circuit chip implementing a spiking neural network with synaptic weights learned using simulation. The spiking neural network includes synapses at cross-point junctions of an interconnection network for interconnecting digital electronic neurons. One-to-one correspondence between the simulation and the chip is maintained with interconnectivity, wherein learned synaptic weights are loaded into the chip.

These and other features, aspects and advantages of the present invention will become understood with reference to the following description, appended claims and accompanying figures.

BRIEF DESCRIPTION OF THE SEVERAL VIEWS OF THE DRAWINGS

FIG. 1B shows an interrelationship correspondence between the simulation and a neuromorphic-synaptronic circuit chip, in accordance with an embodiment of the invention;

DETAILED DESCRIPTION

Embodiments of the invention provide neuromorphic-synaptronic (neuromorphic-synaptronic) systems, including neuromorphic-synaptronic circuits implementing spiking neural network with synaptic weights learned using simulation.

One embodiment comprises simulating a spiking neural network to generate synaptic weights learned via simulation. The learned synaptic weights are loaded (encoded) into a digital neuromorphic-synaptronic circuit chip implementing a spiking neural network. In one embodiment, the architecture of the circuit chip provides a spiking neural network that achieves reduced electrical power consumption and form factor.

In one embodiment, a process for forming the digital circuit chip architecture comprises maintaining one-to-one correspondence between the circuit chip and the simulation. In one example, the one-to-one correspondence is achieved by implementing a spiking neural network in the circuit chip comprising digital integrate-and-fire neurons, discrete-valued synapse devices (synapses) at cross-point junctions of an interconnection network for interconnecting digital electronic neurons (digital neurons), incorporating physical and logical interconnectivity constraints of the chip into the simulation, and eliminating essentially all sources of randomness or non-determinism on the circuit chip.

According to embodiments of the invention, an electronic neuron comprises a digital electronic neuron including digital electronic modules. As such, all references to neurons or electronic neurons herein indicate digital electronic neurons according to embodiments of the invention. Each such neuron has electrically conductive dendrites which carry inputs to the body or soma module of the neuron. Each neuron further has electrically conductive axons which carry the outputs whenever a neuron emits a spike signal. The soma module of a neuron comprises digital circuits configured to provide a function such as make decisions based on stimulus, wherein the soma module is typically attached to the dendrite. In general, in accordance with an embodiment of the invention, a spiking neuron will "fire" (transmit a pulse) when the inputs it receives exceed a threshold.

Figure 1A:
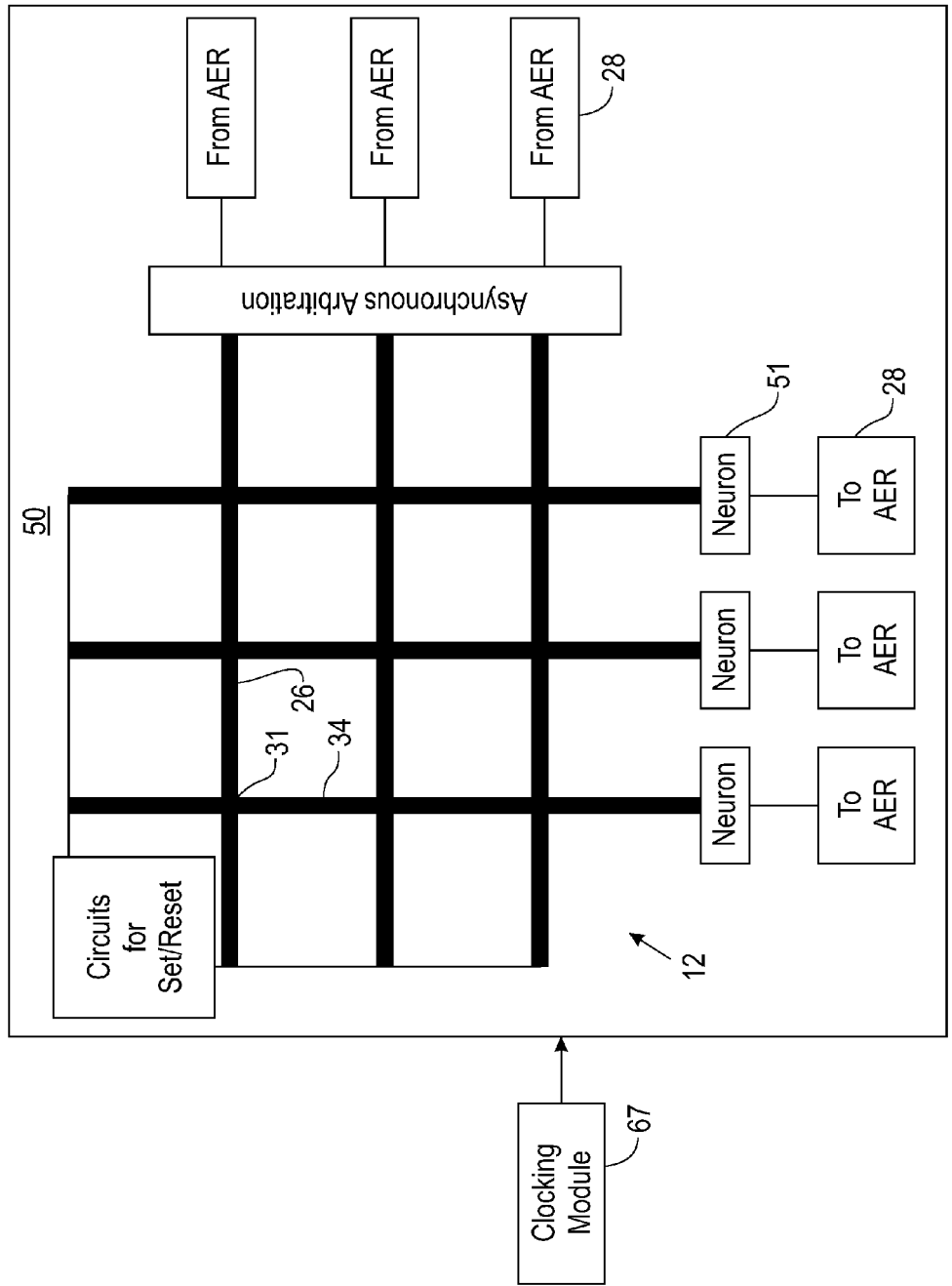
FIG. 1A shows a diagram of a neuromorphic-synaptronic system including digital electronic neurons, implementing spiking neural network with synaptic weights learned using simulation, in accordance with an embodiment of the invention.

According to an embodiment of the invention, a spiking neural network simulator implemented on a computing system learns synaptic weights. A spiking neural network with learned weights is implemented in a low-power, compact, real-time neuromorphic-synaptronic digital hardware system, such as a digital circuit, that has no on-board learning and implements electronic synapses using memory elements. FIG. 1A shows a diagram of an embodiment of a neuromorphic-synaptronic digital system, in accordance with an embodiment of the invention.

The neuromorphic-synaptronic digital system implements a circuit (chip) 50 including digital electronic neurons 51 coupled to a crossbar 12. The crossbar 12 comprises axons 26, dendrites 34, and a synapse 31 at cross-point junctions of each axon 26 and each dendrite 34. As such, each connection between an axon 26 and a dendrite 34 is made through a synapse 31. The junctions where the synapses 31 located are referred to herein as cross-point junctions. In one example, the crossbar array 12 may have a pitch in the range of about 0.1 nm to 10 μm. Circuits 37 for Set/Reset are peripheral electronics that are used to load learned synaptic weights into the chip. An Asynchronous Arbitration module 39 is used to sequentially activate each axon 26 within a time interval.

According to an embodiment of the invention, each synapse 31 has parameters (such as a synaptic weight learned using simulation) that define functional behavior of the synapse 31. As such, synaptic weights for synapses 31 affect the functional behavior of the synapses 31. Such synaptic weights, learned via simulation and loaded on a digital circuit, define function of the synapses on the circuit. A spike signal from a digital neuron on the circuit creates a voltage bias across a connected synaptic 31, resulting in a current flow into down-stream neurons. The magnitude of that current flow is based on the synaptic weight (conductance) of a synapse 31 between each pair of neurons. The magnitude of the current flow, or other sensing mechanisms, are used to deterministically read the synaptic weight of a synapse 31 on the circuit. In one example, an interface module programs synaptic weights such that each synapse 31 in the crossbar 12 has a synaptic weight that affects (e.g., programs) the functional behavior (e.g., electrical conductivity) of the synapse 31 based on the corresponding synaptic weight (e.g., "0" indicating a synapse 31 is not conducting, "1" indicating the synapse 31 is conducting).

In one embodiment of the invention, the building block circuit chip 50 comprises a low-power, ultra-dense neuromorphic-synaptronic circuit implementing a spiking neural network with synaptic weights learned using simulation. A spiking neural network simulator on a computer system such as a supercomputer system learns or otherwise computes synaptic weights. Then, a spiking neural network with learned or computed weights is implemented in a low-power, compact, real-time circuit chip 50.

As shown by an interrelationship example in FIG. 1B, said one-to-one (1:1) correspondence between the simulation and the circuit chip 50 is maintained. In one embodiment, the simulator utilizes a real number to represent a synaptic weight during learning, but after learning the synaptic weights are binary (discrete-valued) for loading onto the circuit chip 50. The simulator may use different parameters for each digital electronic neuron, for example, firing threshold, etc. The parameters are programmed into the circuit chip 50. On the circuit chip 50, each digital electronic neuron 51 is implemented separately for parallelization. In one example, learned weights are loaded into the circuit chip 50 using standard, conventional memory techniques (e.g., circuits 37 for Set/Reset in FIG. 1A).

No restriction is placed on learning rules or strategies used in simulation. The simulator may use, for example, spike-timing dependent plasticity (STDP), reinforcement learning, etc. Reinforcement learning (RL) generally comprises learning based on consequences of actions, wherein an RL module selects actions based on past events. A reinforcement signal received by the RL module is a reward (e.g., a numerical value) which indicates the success of an action. The RL module then learns to select actions that increase the rewards over time. In one embodiment, the simulation may compute the weights in a algorithmic fashion rather than learning.

In one embodiment, the on-chip connectivity (interconnections) between the digital electronic neurons 51 may comprise a combination of hard-wiring implemented using a crossbar (or a cross-quilt) interconnect network, combined with soft-wiring implemented with address events. The simulation maintains one-to-one equivalence with hard-wiring and soft-wiring constraints. The final learned simulation also provides soft-wiring addresses.

In one embodiment, soft-wiring on the circuit chip 50 is implemented using address events which are non-deterministic (e.g., Address-event representation (AER)). For replication in simulation, the simulator incorporates non-determinism by incorporating a random offset to each axonal delay. Simulation incorporates a constraint as a randomness in synapses to account for synaptic yield. Address-event representation (AER) element modules 28 facilitate communications between multiple circuit chip 50, as described further below in relation to FIG. 2.

In general, an interconnection network 12, such as a crossbar or cross-quilt architecture, may comprise a rectangular array or square N×N array of synapses 31 at cross-point junctions of N axons 26 and N dendrites 34 in a circuit chip 50.

According to an embodiment of the invention, electronic neurons 51 are implemented using a digital, synchronous scheme. When an electronic neuron 51 fires, all values (N) are read in parallel at dendrites 34, wherein the electronic neuron states update at a specified resolution, and each neuron implements an axonal delay. As used herein, the term "when" can mean that a signal is sent instantaneously after a neuron fires, or some period of time after the neuron fires.

In one embodiment, digital electronic neurons comprise digital, synchronous designs, wherein in one example each neuron state update occurs at a resolution of about 0.1 msec to 1 msec. Specifically, in one example, the states of the neurons 51 coupled to the interconnection network 12 are updated at a resolution of about 0.1 msec to 1 msec, necessitating a clock rate of 1 to 10 kHz, generated by a digital clocking module 67. As such, each time-step of 1 msec is divided into N steps, requiring a final clock rate of N to 10*N KHz. For example, when N=512, the clock rate would be 512 kHz to 5.12 MHz. Other example values for N include 32, 64, 128, 256, 1024, where 256 is a preferred embodiment.

The circuit chip 50 may implement synapses 31 using memory elements that support parallel read of a row, such as SRAM, DRAM, EDRAM, PCM, MTJ, FLASH, eFuse or any such memory volatile or non-volatile technology. In one example, it is assumed that when a neuron 51 fires, all N values maintained by N synapses 31 connected to the neuron 51 are read in parallel at the dendrites 34.

According to an embodiment of the invention, the circuit chip 50 may include inhibitory electronic neurons. In one example, one out of five neurons are inhibitory neurons. The inhibitory neurons fire during a special part of the time-step. Alternatively, inhibitory neurons can emit a slightly different read sequence.

Generally, an excitatory spiking electronic neuron makes its target neurons more likely to fire, while an inhibitory spiking electronic neuron makes its targets less likely to fire. A variety of implementations of spiking electronic neurons can be utilized. Generally, such neurons comprise a counter that increases when inputs from source excitatory neurons are received and decreases when inputs from source inhibitory neurons are received. The amount of the increase or decrease is dependent on the strength of the connection from a source neuron to a target neuron. If the counter reaches a certain threshold, the neuron then generates its own spike (i.e., fires) and the counter undergoes a reset to a baseline value.

Figure 2:
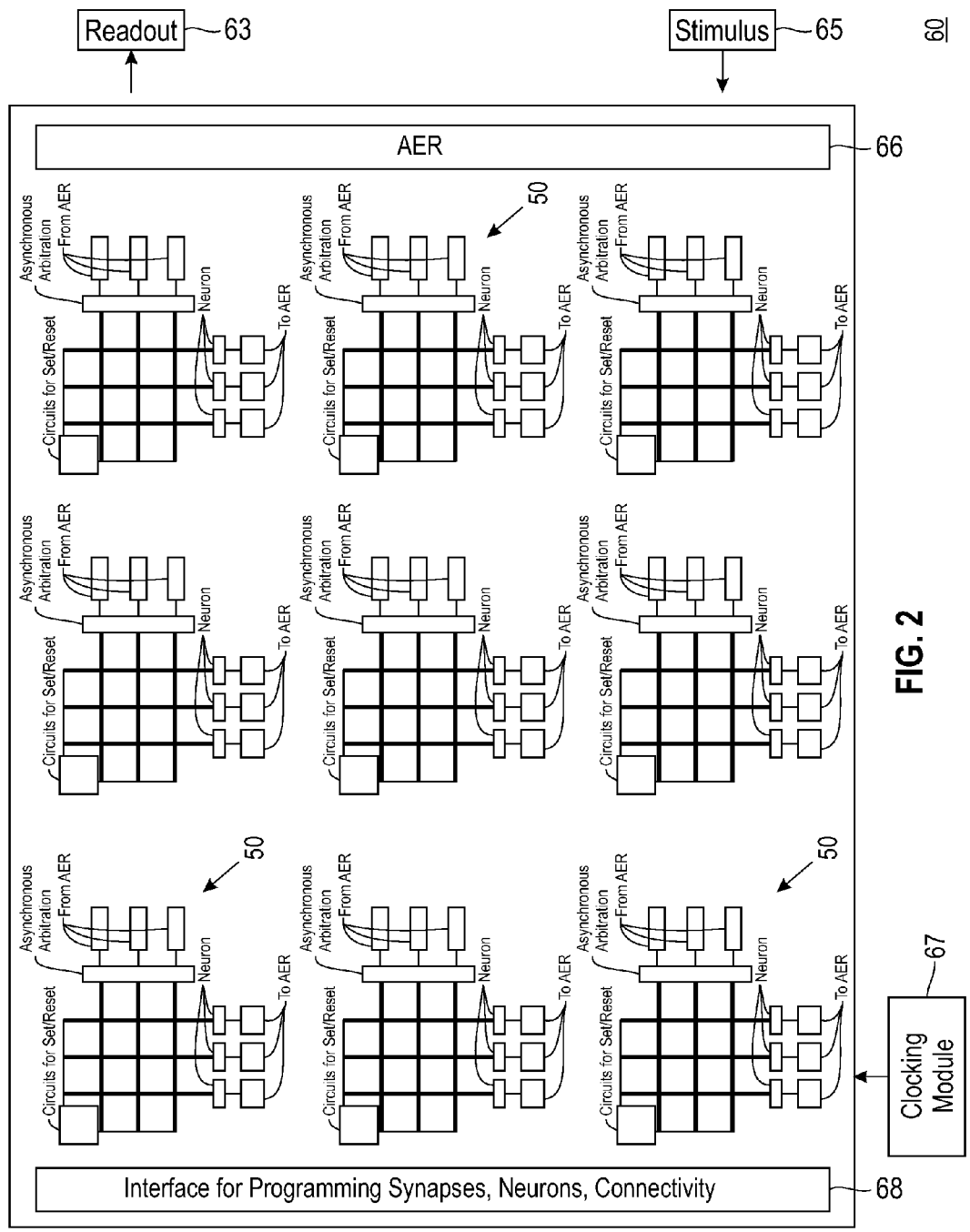
FIG. 2 shows a diagram of a neuromorphic-synaptronic network including multiple neuromorphic-synaptronic circuit chip building blocks in a crossbar interconnection network, in accordance with an embodiment of the invention.

FIG. 2 shows a diagram of an embodiment of a neuromorphic-synaptronic circuit chip 60 including multiple circuit chip blocks 50, according to an embodiment of the invention. In one example, the digital electronic neurons 51 in each chip block 50 operate synchronously at a clock rate of 1 kHz to 10 KHz.

The circuit chip 60 further includes an AER interconnect module 66 configured for providing addressing functions and selectively interconnecting the AER element modules 28. Though not shown, each "to AER" element module 28 is connected to a "from AER" element module 28 via the AER interconnect module 66 which provides soft-wiring between the blocks 50. The crossbar 12 in each block 50 provides hard-wiring therein.

The circuit chip 60 further includes an interface module 68 configured for programming synapses 31, neurons 51 and connectivity 12, according to an embodiment of the invention. Specifically, the interface module 68 provides programming of the weights of synapses 31 learned in simulation. For example, the interface module 68 programs synaptic weights such that each synapse 31 in a crossbar 12 has a value 0 or 1. In each chip block 50, there are 9 synapses 31 per crossbar 12, and 81 synapses 31 for the entire chip array 60. There are 27 neurons 51 in the circuit chip 60 (i.e., 3 neurons 51 per crossbar 12). The neuron parameters (e.g., firing threshold, etc.) learned from simulation are programmed in to the circuit chip 60. Further, there are 27 soft-wiring addresses programmed by the AER 66.

As shown in FIG. 2, a Readout interface 63 reads the firing activity of the neurons 51 in the circuit 60 (e.g., which neuron fired, etc.) in response to stimulus signals into the circuit 60 from a Stimulus interface 65. In one example application, the circuit chip 60 receives sensory inputs from various sensors (not shown) at the Stimulus interface 65, and outputs signals from the Readout interface 63 to actuators.

Access from a neuron 51 to synapses 31 on the crossbar 12 and AER are asynchronous. In one example, access to the crossbar may be synchronous, however, a higher clock rate will be necessary.

Figure 3A:
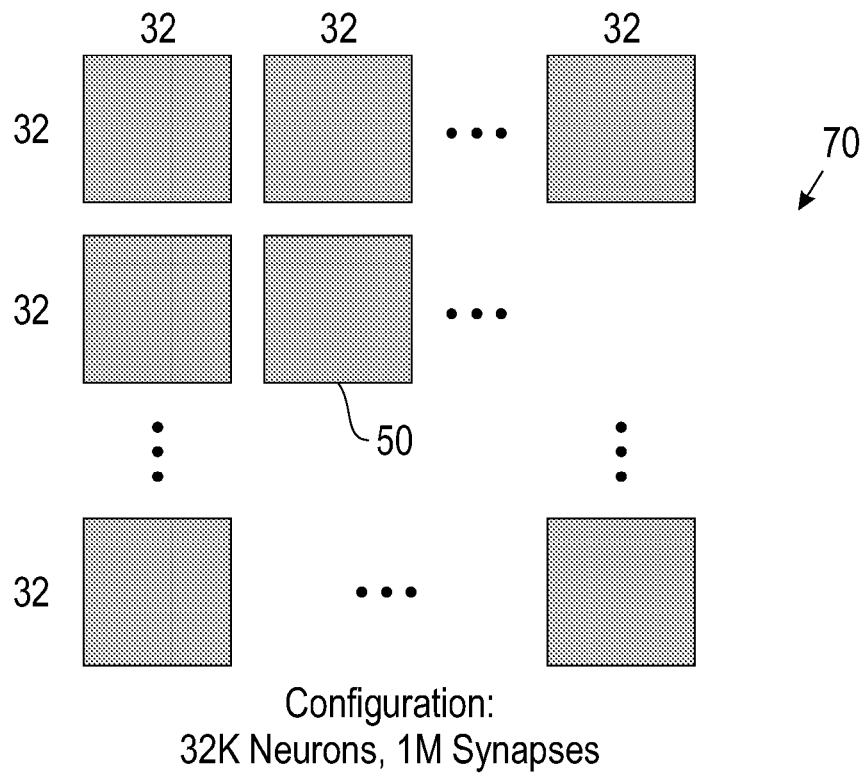
FIG. 3A shows a diagram of a neuromorphic-synaptronic network including multiple neuromorphic-synaptronic circuit chip building blocks in a first configuration, in accordance with an embodiment of the invention.

FIG. 3A shows an example neuromorphic-synaptronic circuit 70 comprising a 32×32 array of blocks 50 including 32*1024 neurons 51 and 1024*1024 synapses 31 (wherein "*" means multiplication).

Figure 3B:
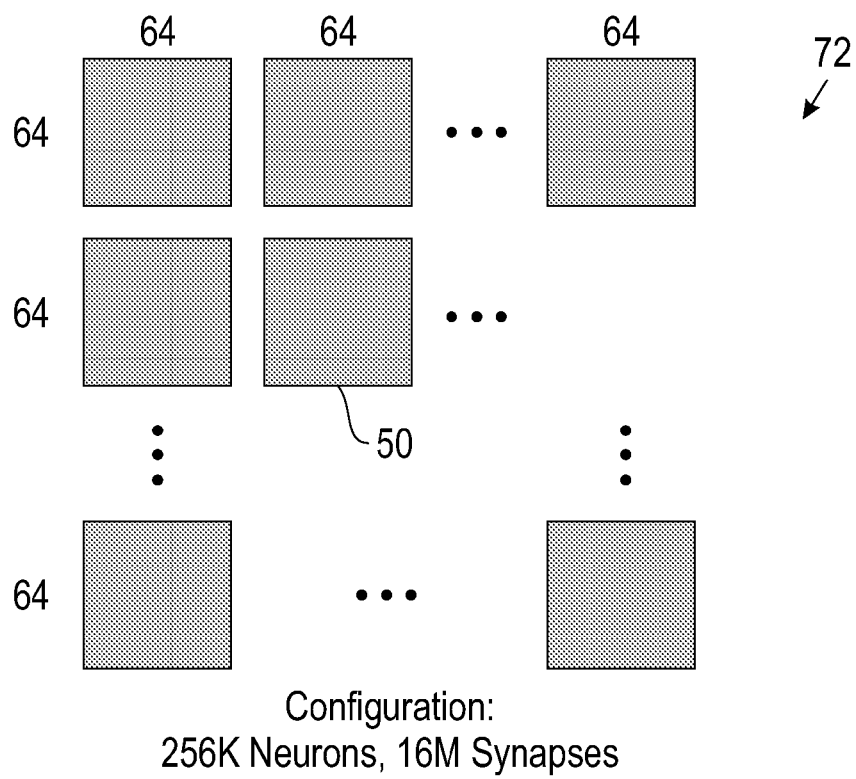
FIG. 3B shows a diagram of a neuromorphic-synaptronic network including multiple neuromorphic-synaptronic circuit chip building blocks in a second configuration, in accordance with an embodiment of the invention.

FIG. 3B shows an example neuromorphic-synaptronic circuit 72 comprising a 64×64 array of blocks 50 including 64*4096 neurons 51 and 4096*4096 synapses 31.

Figure 3C:
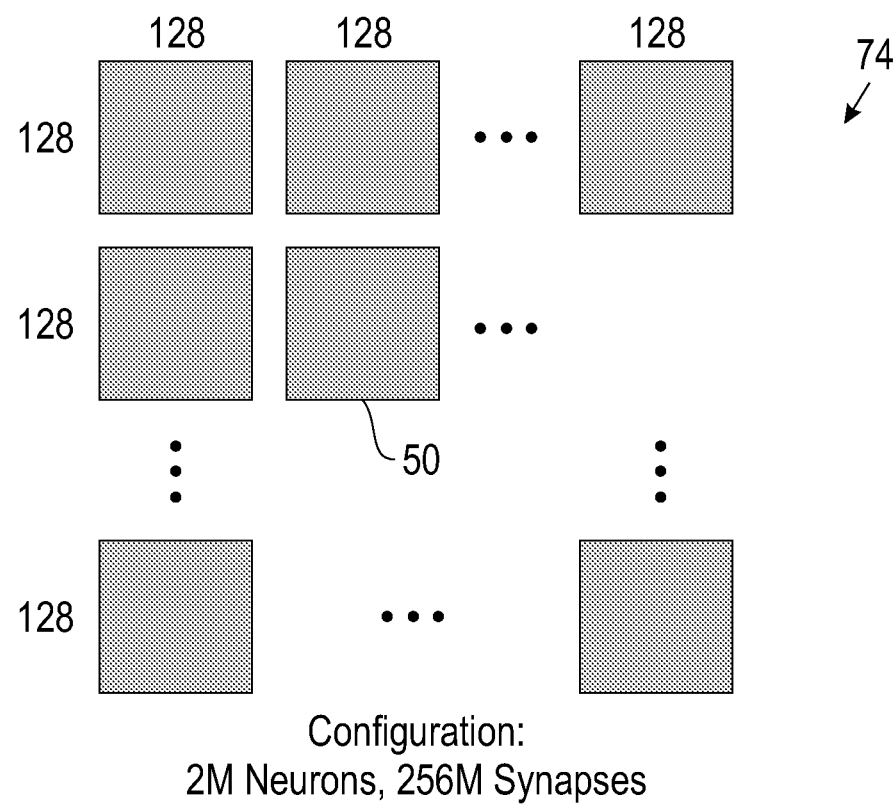
FIG. 3C shows a diagram of a neuromorphic-synaptronic network including multiple neuromorphic-synaptronic circuit chip building blocks in a third configuration, in accordance with an embodiment of the invention.

FIG. 3C shows an example neuromorphic-synaptronic circuit 74 comprising a 128×128 array of blocks 50 including 128*16,384 neurons 51 and 16,384*16,384 synapses 31. Other combinations of blocks 50 are also possible as those skilled in the art will recognize.

Figure 4:
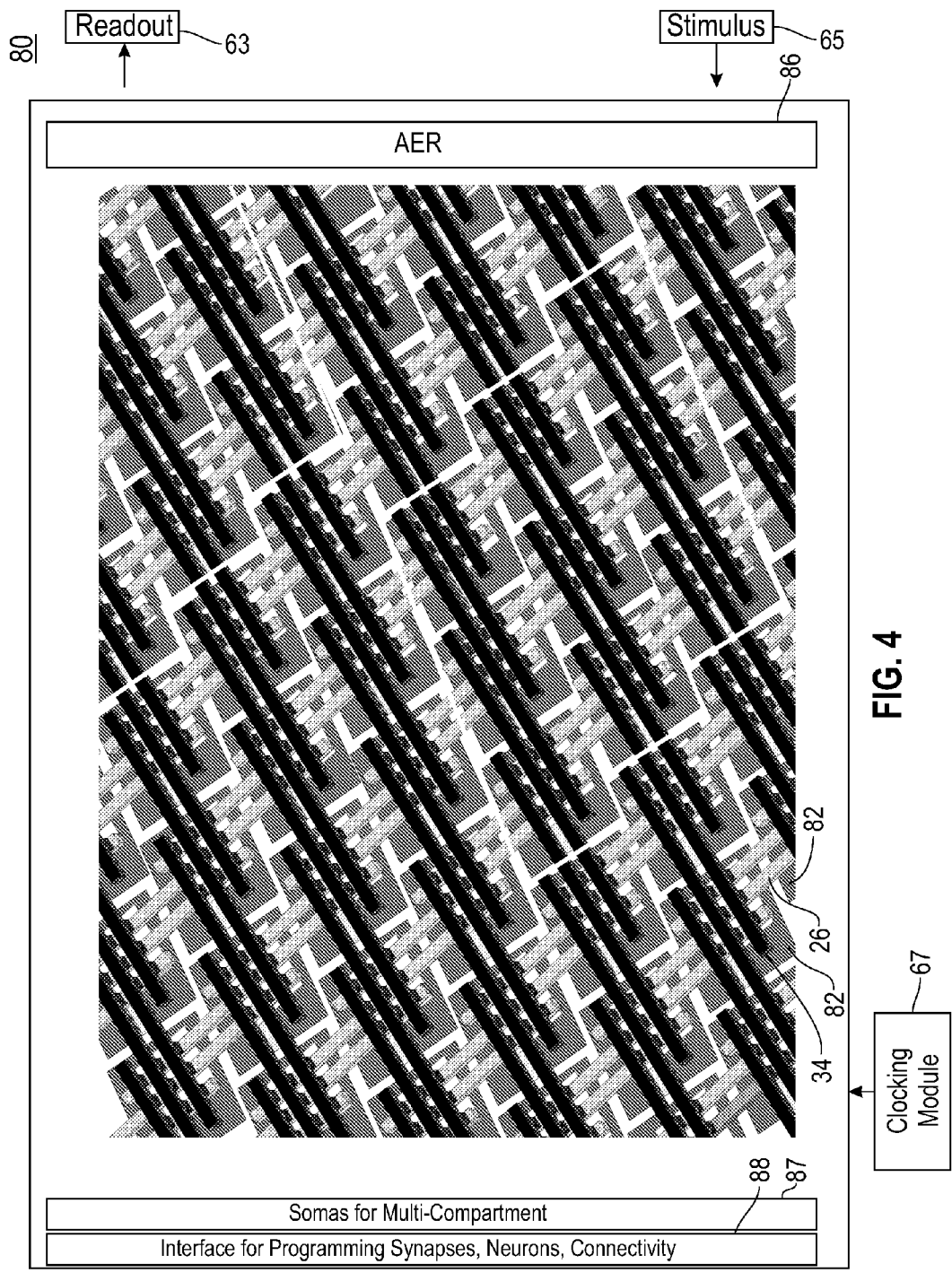
FIG. 4 shows a diagram of a neuromorphic-synaptronic network including multiple neuromorphic-synaptronic circuit chip building blocks in a cross-quilt interconnection network, in accordance with an embodiment of the invention.

FIG. 4 shows a diagram of an embodiment of a neuromorphic-synaptronic circuit 80 including multiple blocks 50, an AER interconnect module 86, soma module 87 for multi-compartmentalization and an interface module 88 for programming synapses, neurons and on-chip interconnectivity, according to an embodiment of the invention.

The circuit chip 80 includes a cross-quilt interconnect network 82 wherein crossbars are intertwined. Synapses, neurons, and connectivity are programmed into the circuit chip 80 from simulation results. Each neuron comprises dendritic compartment that connects to a soma. A soma receives input from several dendritic compartments. The circuit 80 provides a natural 2-dimensional receptive and projective field. For isolation, an N times faster clock may be required for an N×N quilt (e.g., when N=128, the clock rate increase from 128 kHz to 1.28 MHz).

In one embodiment, a digital electronic neuron comprises a dendritic compartment that connects to a soma module. The soma serves to integrate all stimulation received from synapses coupled to a neuron, and responds with an output signal only if a certain threshold is exceeded. For example, a soma receives input from several dendritic compartments. When the soma fires, it transmits its signal to several axonal branches. Generally, each synapse involves the connection of one neuron sending a signal and one neuron receiving the signal.

In one embodiment, the invention is also applicable for transition to a chip with on-board learning, based on synchronous access to a crossbar or cross-quilt interconnect network, with a higher clock rate. The circuit includes STDP set/reset modules. According to an embodiment of the invention, the synapse 31 implements multiple information bits. In one example, according to an RGB scheme, the synapse 31 maintains three bits including a bit R, a bit G and a bit B. Bit R is for read, bit G is for STDP-set and bit B is for STDP-reset.

Figure 5:
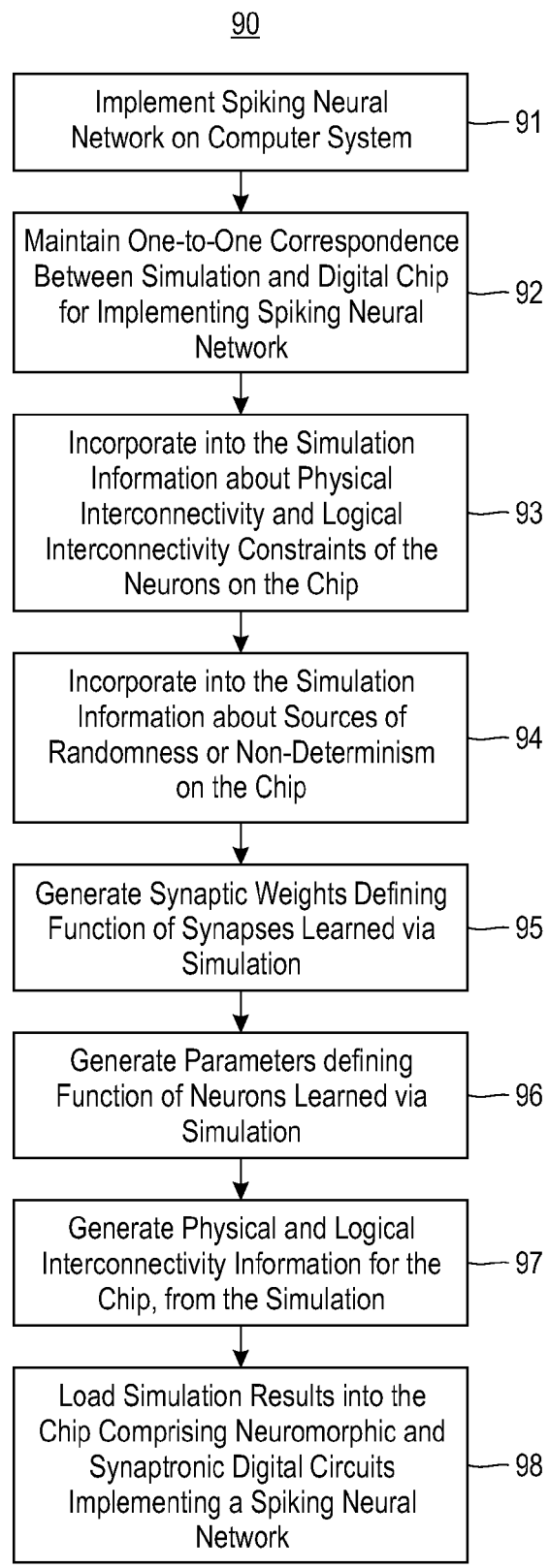
FIG. 5 shows a flowchart of a process for simulating a spiking neural network to generate information learned via the simulation, and loading the learned information on a digital chip comprising digital electronic circuits, according to an embodiment of the invention.

FIG. 5 shows a flowchart of a process 90 for simulating a spiking neural network to generate information learned via the simulation, and loading the learned information on a digital chip comprising digital electronic circuits, according to an embodiment of the invention. The process 90 comprises the following process blocks:

Block 91: Implement a simulation for spiking neural network of digital, synchronous spiking electronic neurons on a computer system.

Block 92: Maintain one-to-one correspondence between a digital chip and the simulation for implementing a spiking neural network using digital integrate-and-fire neurons, discrete-valued synapses at cross-point junctions of an interconnection network for interconnecting the digital neurons.

Block 93: Incorporate into the simulation information about physical interconnectivity (i.e., hard-wiring) and logical interconnectivity (i.e., soft-wiring) constraints of the neurons on the chip.

Block 94: Incorporate into the simulation information about sources of randomness or non-determinism on the chip, to reduce (preferably eliminate all) sources of randomness or non-determinism on the chip. For example, knowledge of randomness in synaptic yield/operation, is incorporated into the simulation.

Block 95: Generate synaptic weights defining function of synapses learned via simulation. Each synapse has parameters that define functional behavior of the synapse. Those parameters can be learned in the simulation and burned into the chip. The chip can only store discrete values of synaptic weights. The simulation may use a real number to represent synaptic weights during learning, and after learning the synaptic weights are converted to binary or discrete values. Regardless of simulation strategy, the output synaptic weights are a type that can be burned on a digital chip.

Block 96: Generate parameters defining function of neurons learned via simulation. Each neuron has parameters that define functional behavior of the neuron. The neuron parameters learned in the simulation can be loaded and burned into the chip, wherein each neuron has a separate circuitry on the chip.

Block 97: Generate physical and logical interconnectivity information for the neurons on the chip, from the simulation.

Block 98: Load (encode) simulation results into the chip. The simulation results comprise synaptic weights for each synapse and parameters for each neuron. Further, information about interconnectivity comprising on-chip hard-wiring and soft-wiring between the neurons, is loaded into the digital chip. The chip comprises neuromorphic-synaptronic digital circuits implementing a spiking neural network.

In one embodiment, the on-chip connectivity (interconnections) between the digital electronic neurons comprises a combination of hard-wiring and soft-wiring between the electronic neurons. Hard-wiring can be implemented using a crossbar (or a cross-quilt) interconnect network. In one example, the hard-wiring comprises a crossbar of axon electrically conductive paths (axons) and transverse electrically conductive dendrite paths (dendrites), with a synapse at each cross-point junction thereof.

In one embodiment, the soft-wiring is achieved using address events implemented by address tables and AER modules. As noted, the simulation maintains one-to-one equivalence with hard-wiring and soft-wiring constraints. The final learned simulation also provides soft-wiring addresses.

Figure 6:
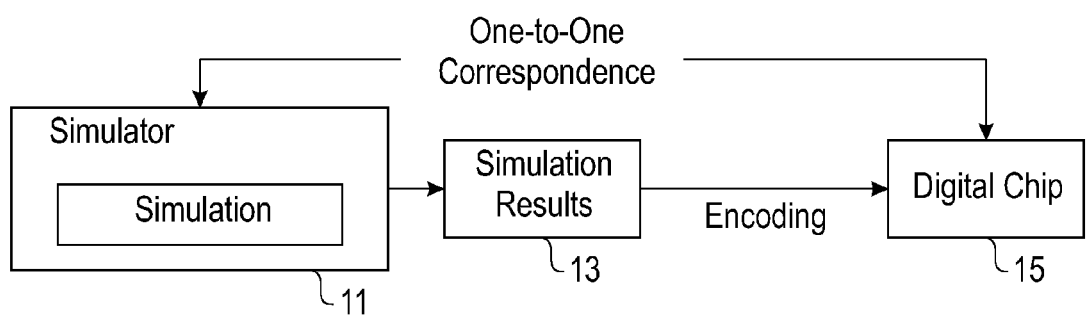
FIG. 6 shows a diagram of a system for simulating a spiking neural network to generate information learned via the simulation, and loading the learned information on a digital chip comprising digital electronic circuits, according to an embodiment of the invention.

FIG. 6 shows a diagram of a system 10 for simulating a spiking neural network using a simulator 11 to generate information (simulation results) 13 learned via the simulation, and loading the learned information on a digital chip 15 comprising digital electronic circuits, according to an embodiment of the invention. One-one-correspondence is maintained between the simulation as described hereinabove according to embodiments of the invention. Preferably, the simulation is primarily focused on chip function (e.g., application, usefulness, utility), whereby the chip provides low-power, compact implementation of that function.

Embodiments of the invention can take the form of a computer simulation or program product accessible from a computer-usable or computer-readable medium providing program code for use by or in connection with a computer, processing device, or any instruction execution system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
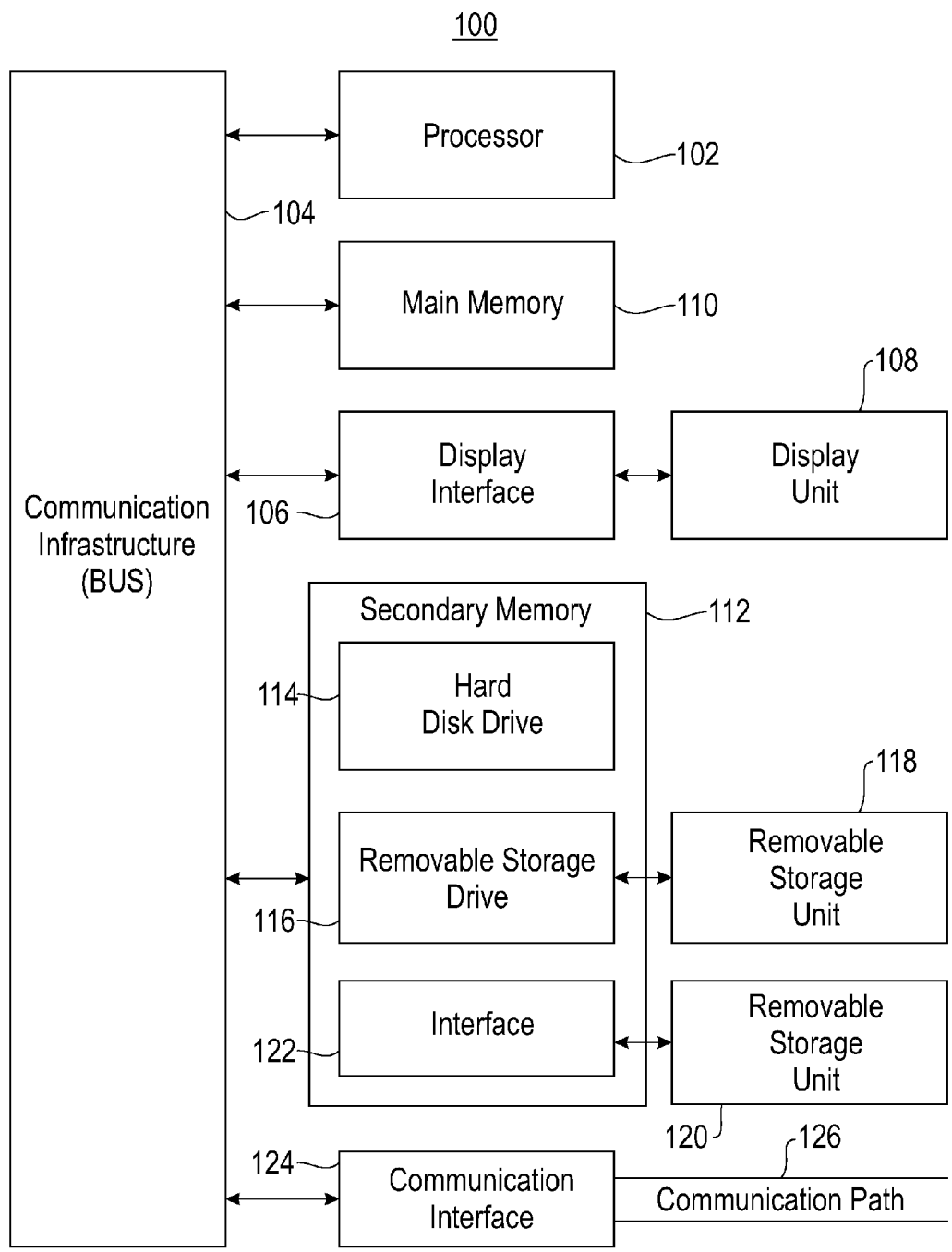
FIG. 7 shows a high level block diagram of an information processing system useful for implementing one embodiment of the present invention.

FIG. 7 is a high level block diagram showing an information processing system 100 useful for implementing one embodiment of the present invention. A spiking neural network simulator in accordance to an embodiment of the invention may be implemented utilizing the system 100.

The computer system 100 includes one or more processors, such as processor 102. The processor 102 is connected to a communication infrastructure 104 (e.g., a communications bus, cross-over bar, or network).

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when run, enable the computer system to perform the features of the present invention as discussed herein. In particular, the computer programs, when run, enable the processor 102 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
simulating a simulation spiking neural network to generate learned information for a digital circuit chip, wherein said digital circuit chip comprises plural synapse devices interconnecting multiple digital electronic neurons; and
loading the learned information into said digital circuit chip to implement a spiking neural network, wherein the learned information comprises synaptic weights for said plural synapse devices, neuron parameters for said multiple digital electronic neurons, and interconnectivity information for on-chip interconnectivity between said multiple digital electric neurons;
wherein the synaptic weights affect functional behavior of said plural synapse devices; and
wherein the spiking neural network implemented on said digital circuit chip has a one-to-one correspondence with said simulation spiking neural network.

2. The method of claim 1, wherein:
said multiple digital electronic neurons include digital integrate-and-fire electronic neurons; and
said plural synapse devices include discrete-valued synapse devices at cross-point junctions of an interconnection network of said digital circuit chip for interconnecting said multiple digital electronic neurons.

3. The method of claim 1, further comprising: incorporating physical interconnectivity and logical interconnectivity constraints of said multiple digital electronic neurons into said simulation spiking neural network.

4. The method of claim 1, further comprising: incorporating information about synaptic yield on said digital circuit chip into said simulation spiking neural network.

5. The method of claim 1, wherein:
the spiking neural network implemented on said digital circuit chip comprises a neuromorphic-synaptronic spiking neural network;
functional behavior of each synapse device comprises electrical conductivity of said synapse device; and
on-chip interconnectivity comprises a combination of physical connectivity and logical connectivity for said multiple digital electronic neurons.

6. The method of claim 5, wherein:
the physical connectivity comprises hard-wiring a crossbar interconnect network of axon paths and dendrite paths on said digital circuit chip, wherein the dendrite paths are orthogonal to the axon paths, and wherein each synapse device is at a cross-point junction of the crossbar interconnect network coupled between a dendrite path and an axon path.

7. The method of claim 6, wherein:
the logical connectivity comprises soft-wiring including address event representation (AER) for selectively addressing said multiple digital electronic neurons.

8. The method of claim 1, wherein:
the neuron parameters define functional behavior of said multiple digital electronic neurons.

9. The method of claim 1, wherein:
said digital circuit chip comprises a low-power, ultra-dense digital circuit chip without on-board learning.

10. The method of claim 1, wherein:
said plural synapse devices comprise memory elements.

11. The method of claim 1, further comprising:
simulating said simulation spiking neural network on a computing system representing a simulator.

12. A device, comprising:
a digital circuit implementing a neuromorphic-synaptronic spiking neural network, wherein the digital circuit comprises:
plural synapse devices; and
multiple digital electronic neurons, wherein said plural synapse devices interconnect said multiple digital electronic neurons;
wherein said digital circuit is loaded with learned information generated by simulating a simulation spiking neural network, wherein the learned information comprises synaptic weights for said plural synapse devices, neuron parameters for said multiple digital electronic neurons, and interconnectivity information for on-circuit interconnectivity between said multiple digital electronic neurons;
wherein the synaptic weights affect functional behavior of said plural synapse devices; and
wherein the spiking neural network implemented on said digital circuit has a one-to-one correspondence with said simulation spiking neural network.

13. The device of claim 12, wherein:
physical interconnectivity and logical interconnectivity constraints of said multiple digital electronic neurons are incorporated into said simulation spiking neural network.

14. The device of claim 13, wherein:
said multiple digital electronic neurons include digital integrate-and-fire neurons; and
said plural synapse devices include discrete-valued synapse devices at cross-point junctions of an interconnection network of said digital circuit for interconnecting said multiple digital electronic neurons.

15. The device of claim 13, wherein:
information about synaptic yield on said digital circuit is incorporated into said simulation spiking neural network.

16. The device of claim 13, wherein:
on-circuit interconnectivity comprises a combination of physical connectivity and logical connectivity for said multiple digital electronic neurons.

17. The device of claim 16, wherein:
the physical connectivity comprises hard-wiring a crossbar interconnect network including axon paths and dendrite paths one said digital circuit, wherein the dendrite paths are orthogonal to the axon paths, and wherein each synapse device is at a cross-point junction of the crossbar interconnect network coupled between a dendrite path and an axon path.

18. The device of claim 17, wherein:
the logical connectivity comprises soft-wiring including address event representation (AER) for selectively addressing said multiple digital electronic neurons.

19. The device of claim 12, wherein:
the neuron parameters define functional behavior of said multiple digital electronic neurons.

20. The device of claim 12, wherein:
said digital circuit comprises a low-power, ultra-dense digital circuit chip without on-board learning.

21. The device of claim 12, wherein:
said plural synapse devices comprise memory elements.

22. The device of claim 12, wherein:
said simulation spiking neural network is simulated on a computing system representing a simulator.

23. A digital neuromorphic-synaptronic spiking neural network circuit, comprising:
multiple digital electronic neurons; and
an interconnect network including a plurality of synapse devices interconnecting said multiple digital electronic neurons;
wherein said digital neuromorphic-synaptronic spiking neural network circuit is loaded with learned information generated by simulating a simulation spiking neural network, wherein the learned information comprises synaptic weights for said plurality of synapse devices, neuron parameters for said multiple digital electronic neurons, and interconnectivity information for on-circuit interconnectivity between said multiple digital electronic neurons;
wherein the synaptic weights affect functional behavior of said plural synapse devices; and
wherein said digital neuromorphic-synaptronic spiking neural network circuit has a one-to-one correspondence with said simulation spiking neural network.

24. The circuit of claim 23, wherein:
said digital electronic neurons comprise digital integrate-and-fire neurons;
said plurality of synapse devices comprise discrete-valued synapse memory elements at cross-point junctions of the interconnect network;
on-circuit interconnectivity comprises a combination of physical connectivity and logical connectivity for the digital neurons; and
physical and logical interconnectivity constraints of said multiple digital electronic neurons are incorporated into said simulation spiking neural network.

25. The circuit of claim 24, wherein:
said digital neuromorphic-synaptronic spiking neural network circuit comprises a low-power, ultra-dense circuit chip without on-board learning;
the physical connectivity comprises hard-wiring a crossbar interconnect network including axon paths and dendrite paths on said chip, wherein the dendrite paths are orthogonal to the axon paths, and wherein each synapse device is at a cross-point junction of the crossbar interconnect network coupled between a dendrite path and an axon path;
logical connectivity comprises soft-wiring including address event representation (AER) for selectively addressing said multiple digital electronic neurons; and
the neuron parameters define functional behavior of said multiple digital electronic neurons.

* * * * *